June 16, 1925.
A. S. KIRSHNER
FRUIT AND LIKE PRESS
Filed Aug. 16, 1924   2 Sheets-Sheet 2
1,542,558
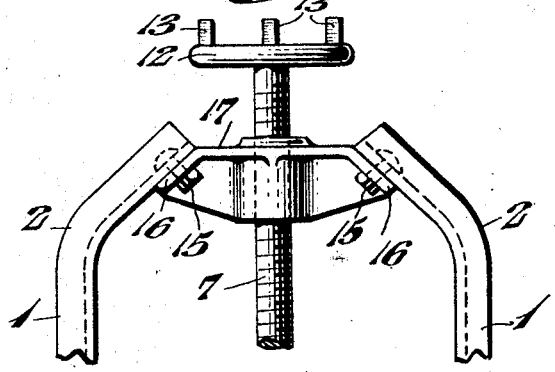
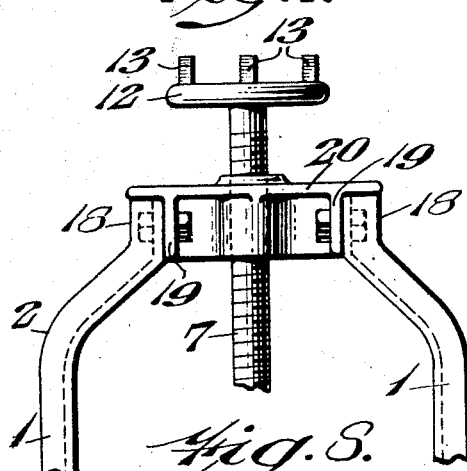
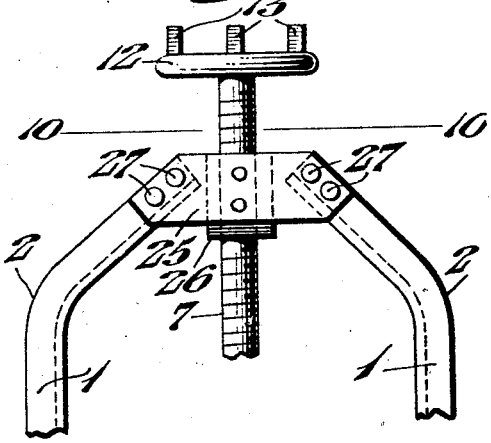
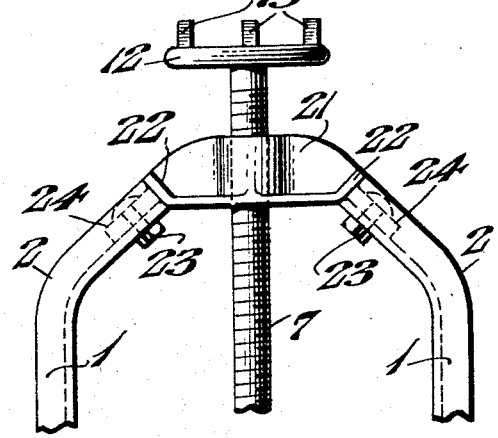
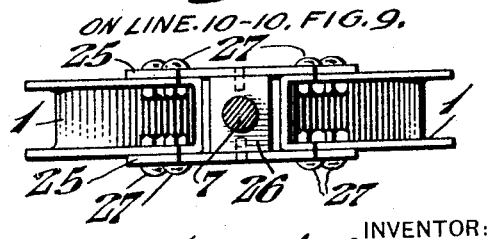
INVENTOR:
Abraham S. Kirshner
BY
ATTORNEYS.

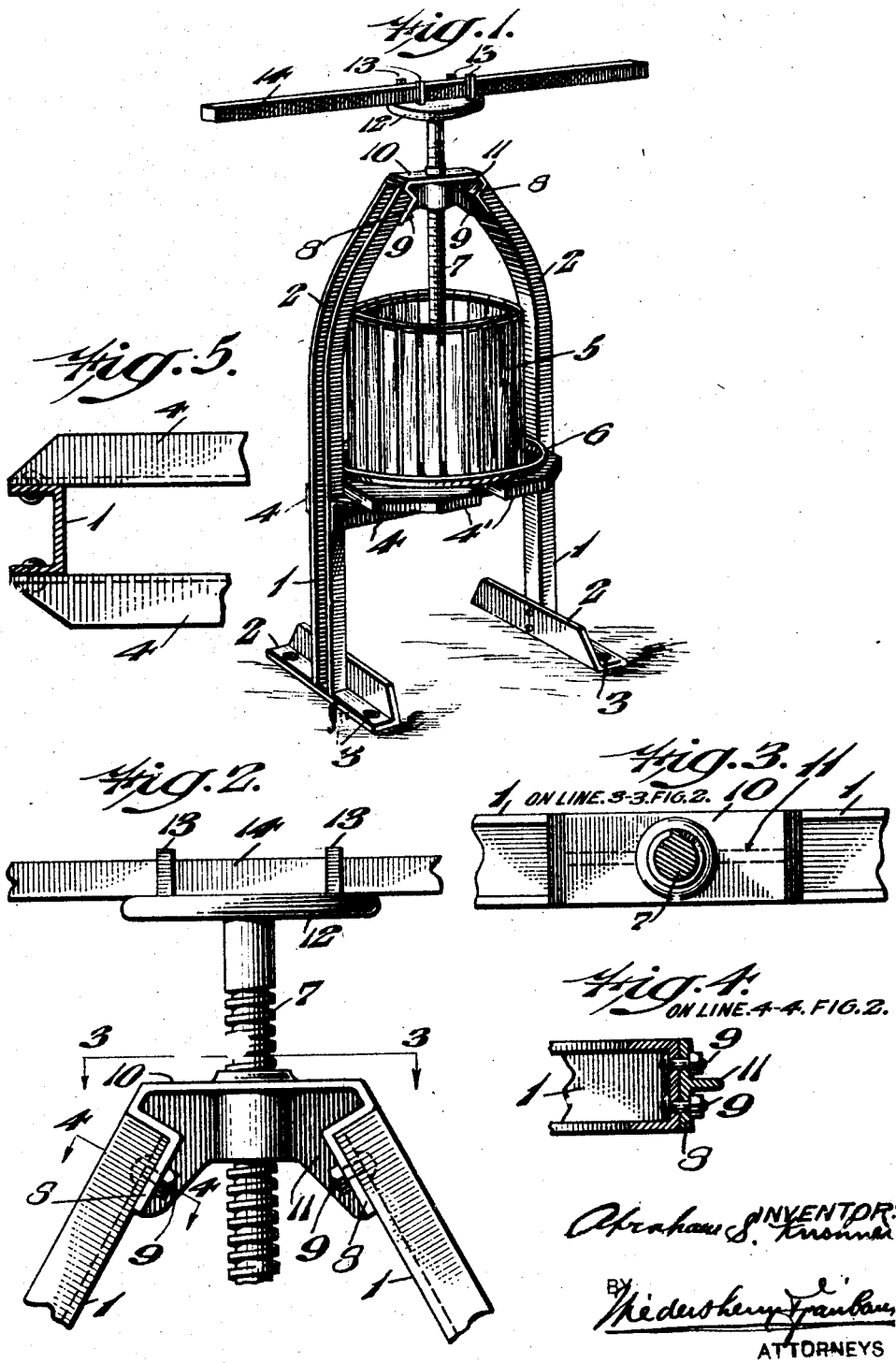

Patented June 16, 1925.

1,542,558

UNITED STATES PATENT OFFICE.

ABRAHAM S. KIRSHNER, OF PHILADELPHIA, PENNSYLVANIA.

FRUIT AND LIKE PRESS.

Application filed August 16, 1924. Serial No. 732,366.

*To all whom it may concern:*

Be it known that I, ABRAHAM S. KIRSHNER, a citizen of the United States, residing in Philadelphia, county of Philadelphia, State of Pennsylvania, have invented certain new and useful Fruit and like Presses, of which the following is a specification.

The principal object of the present invention is to provide a comparatively inexpensive, efficient, durable, and easily constructed support or framework of a fruit or like press. Other and further objects of the present invention relate to the provision of general details of construction and arrangement of parts for attaining results sought by said principal object. Still other and further objects not at this time appearing will be hereinafter more specifically referred to.

The invention consists of the novel construction hereinafter described and finally claimed.

The nature, characteristic features and scope of the invention will be more fully understood from the following description taken in connection with the accompanying drawings forming part hereof, and in which:

Fig. 1, is a perspective view of a fruit or like press embodying features of the invention.

Fig. 2, is a fragmentary view in elevation of the upper portion of Fig. 1.

Fig. 3, is a view in section taken upon the line 3—3 of Fig. 2.

Fig. 4, is a fragmentary view in section taken on the line 4—4 of Fig. 2, illustrating the manner of attaching a support to the cross head.

Fig. 5, is a fragmentary view, partly in section of the tub support shown in Fig. 1.

Fig. 6, is a fragmentary view of the upper part of Fig. 1, but showing a modified form.

Fig. 7, is a similar view of another form.

Fig. 8, is a similar view of still another form.

Fig. 9, is a similar view of a still further modified form, and

Fig. 10, is a view in section taken upon the line 10—10 of Fig. 9.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, and more especially to Figs. 1 to 5, the numeral 1 designates a pair of standards arranged in parallelism which standards at their upper ends curve inwardly as at 2. These standards are formed of channel iron which is of standard construction and may be readily bent to the form shown in Fig. 1. The supports 1 are each mounted upon a base 2, of angle iron, which base being apertured as at 3 so that the device may be secured to a standard support if desired. Connecting the supports 1, intermediate the top and bottom thereof are a pair of cross pieces 4 of angle iron for supporting slabs 4' and a tub 5 preferably made up of vertical slats in order to readily permit the tub contents to be expressed. The tub 5 is seated within a dished base 6, which latter is arranged upon slabs 4'. Connecting the upper ends of the curved supports 1 is a head through which operates the plunger screw 7. This head comprises a member having a flat, horizontal top 10 terminating upon opposite sides in inverted L-shaped seats to receive the upper ends of the supports 1. These seats are designated 8 and bolts 9 are employed for rigidly securing a support to its seat. A vertical rib 11 connects the top 10 and seats 8 in order to provide rigidity. Such a head may be readily detached from the supports when desired, and provides an excellent medium through which to operate the tub plunger and is inexpensive to manufacture. The plunger screw 7 is provided at its top with a disk 12, provided with a plurality of vertically disposed pins 13 of which there are four. Removably inserted through adjacent pairs of pins 13 is a plunger screw operating bar 14. This bar is of rectangular cross section and is of a width substantially equal to the distance between adjacent pins 13 so that a snug fit of the bar with respect to the disc 12 is secured. Thus the bar is prevented from slipping off the disc 12 when operating the screw 7.

In Fig. 6, the L-shaped seats are omitted, the ends of supports 1 being bolted as at 15 directly to inclined ends 16 of head 17.

In Fig. 7, the ends of supports 1 are bent upwardly in vertical manner as at 18 and are bolted to inverted L-shaped seats 19 of head 20.

In Fig. 8, the head 21 is similar to that shown in Fig. 6, except it is positioned in a reverse manner so that the inclined ends 22 project upwardly and the ends of supports 1 are bolted as at 23 to inclined fingers 24 depending from ends 22 of head 21.

In Fig. 9 and 10 the head comprises in plan a substantially H-shaped construction made up of side plates 25 and a cross piece 26 through which the screw 7 passes. The ends of supports 1 are accommodated between the plate 25 and are bolted thereto as at 27.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

What I claim is:

1. A device of the character stated comprising a pair of detachably connected parallel supports of channel iron, which supports are curved inwardly at their upper portions, a removable, relatively short head provided with angular seats to receive the converging ends of said supports, and means for rigidly and removably securing said supports to said seats.

2. A device of the character stated comprising a pair of detachably connected parallel supports of channel iron, which supports are curved inwardly at their upper portions, a removable, relatively short head provided with angular seats to receive the converging ends of said supports, means for rigidly and removably securing said supports to said seats, and a base of angle iron rigidly secured to each of said supports.

3. A device of the character stated comprising a pair of detachably connected parallel supports of channel iron, which supports are curved inwardly at their upper portions, a removable relatively short head provided with angular seats to receive the converging ends of said supports, means for rigidly and removably securing said supports to said seats, a base of angle iron rigidly secured to each of said supports, and a laterally arranged tub support comprised of angle irons one of which is fixed to opposite sides of each vertical support.

4. In a device of the character stated having a pair of parallel supports of channel iron which supports are curved inwardly at their upper portions, the combination of a head having a flat top terminating in opposed, inverted L-shaped seats to receive the upper ends of said supports, a vertically disposed reinforcing plate connecting said flat top and said seats, and means for clamping said supports to said seats.

ABRAHAM S. KIRSHNER.

Witness:
E. HAYWARD FAIRBANKS.